(12) United States Patent
Song et al.

(10) Patent No.: US 11,770,021 B2
(45) Date of Patent: Sep. 26, 2023

(54) WIRELESS CHARGING MODULE COATED WITH MAGNETIC MATERIAL ON SURFACE OF COIL

(71) Applicant: WITS Co., Ltd., Yongin-si (KR)

(72) Inventors: Du Hyun Song, Suwon-si (KR); Seung Jae Baeck, Suwon-si (KR); Chun Su Yoon, Suwon-si (KR); Jeong Yub Yang, Suwon-si (KR); Dong Hyun Kim, Suwon-si (KR); Yong Gu Yoon, Suwon-si (KR); Ji Hoon Yeom, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/682,361

(22) Filed: Feb. 28, 2022

(65) Prior Publication Data

US 2023/0014542 A1    Jan. 19, 2023

(30) Foreign Application Priority Data

Jul. 8, 2021   (KR) .................. 10-2021-0089959
Dec. 9, 2021   (KR) .................. 10-2021-0176138

(51) Int. Cl.
*H02J 50/00*     (2016.01)
*H02J 50/10*     (2016.01)
*H01F 27/24*     (2006.01)
*H01F 27/28*     (2006.01)
*H04B 5/00*      (2006.01)

(52) U.S. Cl.
CPC .......... *H02J 50/005* (2020.01); *H01F 27/24* (2013.01); *H01F 27/2804* (2013.01); *H02J 50/10* (2016.02); *H04B 5/0037* (2013.01)

(58) Field of Classification Search
CPC ........ H02J 50/005; H02J 50/10; H01F 27/24; H01F 27/2804; H04B 5/0037
See application file for complete search history.

(56) References Cited

U.S. PATENT DOCUMENTS 9,761,522 B2    9/2017  Chu et al.
2002/0101683 A1*  8/2002  Katakura .............. G11B 5/17
                                              360/123.28
(Continued)

FOREIGN PATENT DOCUMENTS

JP   2002-151332 A      5/2002
JP   2002151332 A  *   5/2002  ............ G11B 5/17
(Continued)

*Primary Examiner* — Carlos Amaya
(74) *Attorney, Agent, or Firm* — Harness, Dickey & Pierce, P.L.C.

(57) ABSTRACT

Disclosed is a coil module that receives or transmits electric power or signals wireless by using an electromagnetic field, the coil module including a board, a coil provided on at least one surface of the board to be rotated in one direction, and a magnetic part covering at least a portion of the coil while directly contacting a surface of the coil, and that acts as an electromagnetic booster that enhances an intensity of the electromagnetic field generated on the surface of the coil, and the magnetic part decrease, among a skin effect and a proximity effect of an eddy current generated in the coil, the proximity effect by isolating electric power in a gap of the coil that is rotated in the one direction.

18 Claims, 24 Drawing Sheets

(7 of 24 Drawing Sheet(s) Filed in Color)

(56) References Cited

U.S. PATENT DOCUMENTS

| | | | | |
|---|---|---|---|---|
| 2015/0109088 A1* | 4/2015 | Kim | ................... | H01F 17/0013 336/200 |
| 2019/0221351 A1* | 7/2019 | Jeong | ...................... | H01F 27/24 |
| 2020/0153282 A1* | 5/2020 | Koyanagi | ............... | H02J 50/90 |

FOREIGN PATENT DOCUMENTS

| | | | | | |
|---|---|---|---|---|---|
| JP | 2013-65828 A | | 4/2013 | | |
| JP | 2013065828 A | * | 4/2013 | ......... | H01F 17/0006 |
| JP | 2020-178034 A | | 10/2020 | | |
| JP | 2020178034 A | * | 10/2020 | ............ | H01F 38/14 |
| KR | 10-2014-0113204 A | | 9/2014 | | |
| KR | 20140113204 A | * | 9/2014 | .......... | H01Q 1/2216 |
| KR | 101499331 B1 | | 3/2015 | | |
| KR | 10-2019-0087828 A | | 7/2019 | | |
| KR | 20190087828 A | * | 7/2019 | ........ | H01F 1/15333 |
| KR | 20190136447 A | | 12/2019 | | |

\* cited by examiner

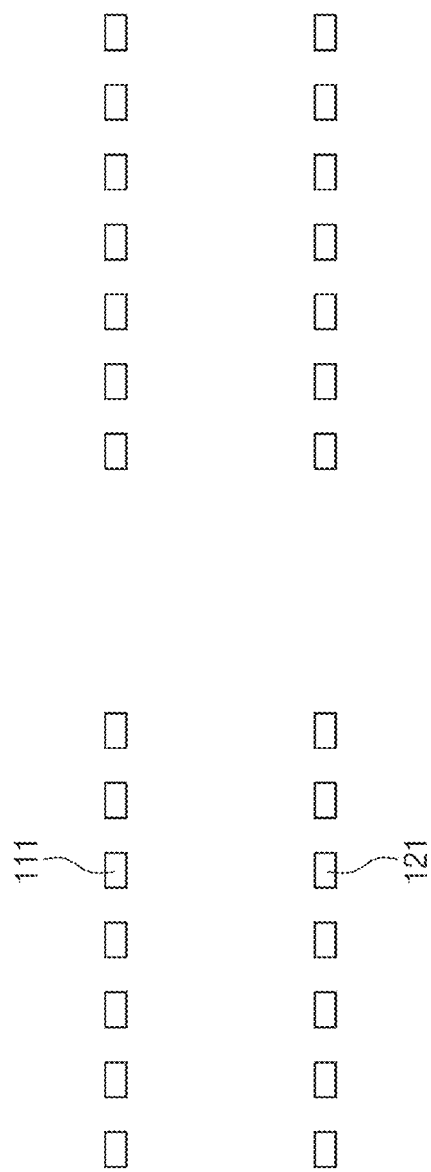

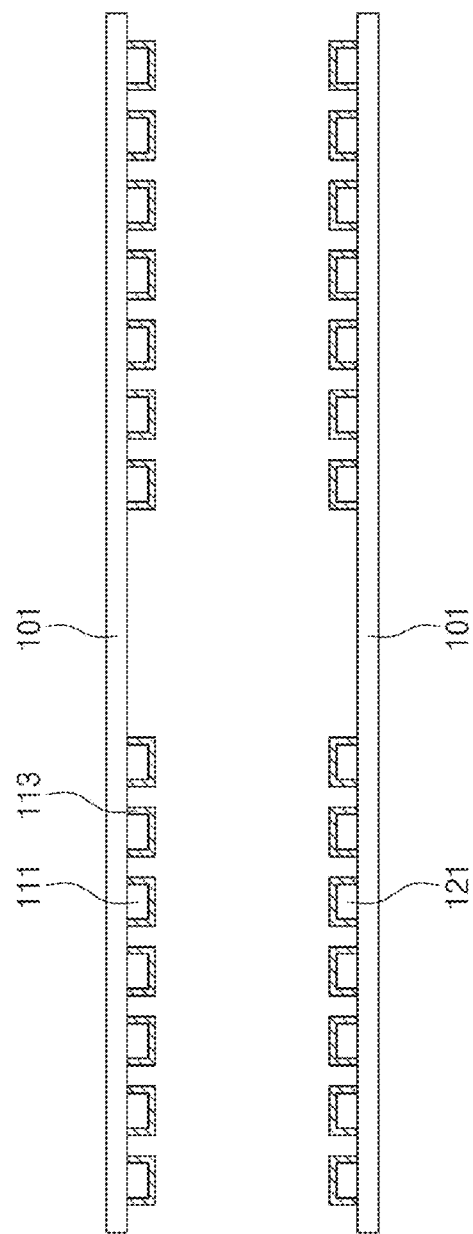

WIRELESS CHARGING MODULE COATED WITH MAGNETIC MATERIAL ON SURFACE OF COIL

CROSS-REFERENCE TO RELATED APPLICATIONS

This application claims priority under 35 U.S.C. § 119 to Korean Patent Applications No. 10-2021-0089959 filed on Jul. 8, 2021 and No. 10-2021-0176138 filed on Dec. 9, 2021, in the Korean Intellectual Property Office, the disclosures of which are incorporated by reference herein in their entireties.

BACKGROUND

The inventive concept relates to a coil module coated with a magnetic material on a surface of a coil.

In recent years, a wireless power transfer (WPT) function, a near field communication (NFC) function, a magnetic secure transmission (MST) function, and the like have been employed in mobile portable devices. The WPT, NFC, and MST technologies are different in operation frequencies, data transmission rates, electric energy transmitted, and the like.

In a wireless power transmission device, various forms of coils are used, and the WPT, NFC, and MST technologies are implemented by using a magnetic field and an electric field formed by the coils.

Recently, as requirements for small sizes and multiple functions of electronic device have been increased, wireless charging modules and magnetic sheets included therein need to be small-sized, and demands on coil modules having an excellent heat dissipation performance in addition to transmission of signals and electric power at high efficiency are increased as well.

SUMMARY

Embodiments of the inventive concept provide a wireless charging coil module that has a high wireless charging efficiency while showing an excellent heat dissipation effect when low, middle, or high electric power is wirelessly transmitted and received for a long time.

In an embodiment of the inventive concept, a coil module that receives or transmits electric power or signals wirelessly by using an electromagnetic field includes a board, a coil provided on at least one surface of the board to be rotated in one direction, and a magnetic part covering at least a portion of the coil while directly contacting a surface of the coil, and that acts as an electromagnetic booster that enhances an intensity of the electromagnetic field generated on the surface of the coil, and the magnetic part decrease, among a skin effect and a proximity effect of an eddy current generated in the coil, the proximity effect by isolating electric power in a gap of the coil that is rotated in the one direction.

In an embodiment of the inventive concept, the magnetic part may include at least one of a metal pallet, a nano crystal, an amorphous material, a metal-based or ferrite pellet, a ferrite complex, a sendust pallet, and a sendust complex.

In an embodiment of the inventive concept, the magnetic part may include a combination of two or three or more elements selected from a group consisting of Fe, Ni, Co, Mn, Al, Zn, Cu, Ba, Ti, Sn, Sr, P, B, N, C, W, Cr, Bi, Li, Y, and Cd.

In an embodiment of the inventive concept, the magnetic part may include Fe, Ni, Mn, and C.

In an embodiment of the inventive concept, the magnetic part may further include Si and B as impurities.

In an embodiment of the inventive concept, the board may be provided as a rigid printed circuit board, a flexible printed circuit board, or a rolled copper printed circuit board.

In an embodiment of the inventive concept, the coil may be provided as a winding, and the coil may include at least one of a copper coil, a multiline coil, a laminated ceramic condenser coil, a low-temperature co-fired ceramic coil, and a ceramic winding coil.

In an embodiment of the inventive concept, the coil may be provided on the board, and the magnetic part may cover at least a portion of an upper surface and a side surface of the coil.

In an embodiment of the inventive concept, a thickness of the magnetic part may be 0.01 μm to 80 μm.

In an embodiment of the inventive concept, the magnetic part provided between adjacent portions of the coil may have a spacing part between the adjacent portions of the coil.

In an embodiment of the inventive concept, the spacing part may be filled with air or an insulating material.

In an embodiment of the inventive concept, a cross-section that is perpendicular to a lengthwise direction of the coil may have a wire shape, and the magnetic part may cover an entire outer peripheral surface of the coil.

In an embodiment of the inventive concept, a cross-section that is perpendicular to a lengthwise direction of the coil may have a quadrangular shape.

In an embodiment of the inventive concept, the magnetic part may be provided on a side surface of the coil, and an upper surface of the coil may be exposed to an outside.

In an embodiment of the inventive concept, in the coil arranged in the first direction, the magnetic part may be provided alternately.

In an embodiment of the inventive concept, the board may include a magnetic sheet, and an insulation part provided between the magnetic sheet and the coil, and the coil module may further include an additional insulation part provided on the coil and covering the coil and the magnetic part.

The coil module may further include an insulation part provided on the coil and covering the coil and the magnetic part.

In an embodiment of the inventive concept, the coil may include a first terminal part spirally arranged on the board, and connected to one of opposite ends of the coil, and a second terminal part connected to the other of the opposite ends of the coil.

In an embodiment of the inventive concept, the coil module may further include a bridge provided separately from the board.

In an embodiment of the inventive concept, the coil may include a plurality of coils provided in different areas, and at least one of the coils provided in the different areas may include a magnetic part covering at least a portion of the coil while directly contacting the coil.

In an embodiment of the inventive concept, the coils may include a first coil provided on the board, and a second coil provided on an outside of the first coil to surround the first coil.

In an embodiment of the inventive concept, the first coil and the second coil may be any one of a coil for wireless power transfer (WPT), a coil for near field communication (NFC), and a coil for magnetic secure transmission (MST).

BRIEF DESCRIPTION OF THE FIGURES

The above and other objects and features will become apparent from the following description with reference to the following figures, wherein like reference numerals refer to like parts throughout the various figures unless otherwise specified. The patent or application file contains at least one drawing executed in color. Copies of this patent or patent application publication with color drawing(s) will be provided by the Office upon request and payment of the necessary fee.

FIGS. 14A, 14B, 15A, 15B, 16A, 16B, 17A, and 17B illustrate simulation results obtained by measuring current densities (that is, intensities of magnetic fields) between a transmission part coil module and a reception part coil module according to an existing invention and between a transmission part coil module and a reception part coil module according to an embodiment of the inventive concept.

DETAILED DESCRIPTION

The following terms are considered to be well understood by an ordinary person in the art, but the following definitions are described to easily explain the essence of the inventive concept disclosed herein.

Unless defined otherwise, all the technical and scientific terms used herein have the same meanings as those generally understood by an ordinary person in the art, to which the essence of the inventive concept disclosed herein pertains. Arbitrary methods, devices, and materials that are similar to or equivalent to those described herein may be used to a performance or inspection of the essence of the inventive concept described herein, but representative method, device, and material will be described now.

The inventive concept relates to a coil module including an antenna or a coil used for transmitting or receiving electric power or signals by using an electromagnetic field, and more particularly, to a coil module that minimizes a proximity effect by directly coating a magnetic part on a surface of a coil. The coil is used as an antenna and may be referred to as an antenna, but in any case, will be referred to as a coil for convenience of description herein.

The coil module may be used in a wireless charging device, but is not limited thereto and may be used for various transmissions/receptions of signals. For convenience of description, a coil used for a wireless charging device will be mainly described hereinafter, but the inventive concept is not limited thereto, and the purposes thereof will be variously changed within a limit of the inventive concept.

Hereinafter, a preferred embodiment of the inventive concept will be described in detail with reference to the accompanying drawings.

Figure 1:
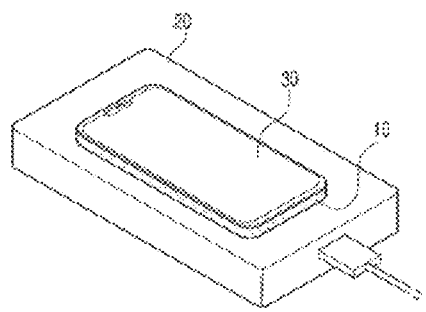
FIG. 1 is a perspective view schematically illustrating an external appearance of a wireless charging system according to an embodiment of the inventive concept.
Figure 2:
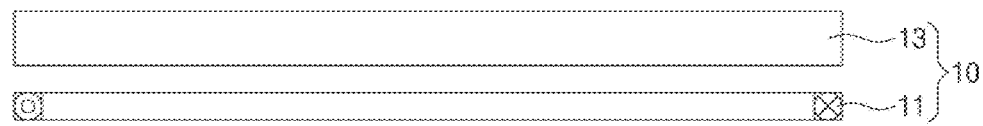
FIG. 2 is an exploded cross-sectional view schematically illustrating main internal configurations of FIG. 1.
Figure 2:

FIG. 1 is a perspective view schematically illustrating an external appearance of a wireless charging system according to an embodiment of the inventive concept. FIG. 2 is an exploded cross-sectional view schematically illustrating main internal configurations of FIG. 1.

Referring to FIGS. 1 and 2, a wireless charging system may include a wireless power transmitting device 20 and a wireless power receiving device 10. The wireless power receiving device 10 may be included in various electronic devices 30 such as a mobile phone, a notebook, and a table PC.

The wireless power receiving device 10 may include a battery 13, and a reception part coil module 11 for charging the battery 13 by supplying electric power to the battery 13.

The battery 13 may be a nickel hydrogen battery or a lithium ion battery that may be charged or discharged. Furthermore, the battery 13 may be implemented to be provided separately from the wireless power receiving device 10 to be attached to or detached from the wireless power receiving device 10, or may be implemented of an integral type to be integrally formed with the battery 13 and the wireless power receiving device 10.

The wireless power transmitting device 20 is adapted to charge the battery 13 of the wireless power receiving device 10, and may include a device board and a transmission part coil module 21 in an interior thereof. The transmission part coil module 21 may be provided on the device board.

The wireless power transmitting device 20 may convert AC power supplied from an outside to DC power, and in turn may convert the DC power to an AC voltage of a specific frequency to provide the AC voltage to the wireless power receiving device 10. A magnetic field of the transmission part coil module 21 is changed when the AC voltage is applied to the transmission part coil module 21 in the wireless power transmitting device 20. When a magnetic field formed by the transmission part coil module 21 is changed, a magnetic field in the reception part coil module 11 of the wireless power receiving device 10 also is changed, and the battery 13 is charged as a voltage is applied according to the change in the magnetic field in the reception part coil module 11.

The transmission part coil module 21 and the reception part coil module 11 may be electromagnetically coupled to each other. The transmission part coil module 21 and the reception part coil module 11 may include a coil formed by winding a metal wire such as a copper wire on a plane. In this case, a winding shape of the coil may be a circular shape, a quadrangular shape, and a rhombus shape, and the entire size or the number of windings thereof may be properly controlled according to required characteristics.

A magnetic sheet may be additionally disposed between the reception part coil module 11 and the battery 13 and/or between the transmission part coil module 21 and the device board. Then, the magnetic sheet may be located between the reception part coil module 11 and the battery 13 to collect magnetic fluxes, and thus she magnetic fluxes may be effectively received by the reception part coil module 11. In addition, the magnetic sheet functions to interrupt at least some of the magnetic fluxes from reaching the battery 13.

In an embodiment of the inventive concept, the coil may be used for magnetic secure transfer (MST), near field wireless communication (NFC), and the like, in addition to the wireless charging device. This will be described later.

Hereinafter, both of the transmission part coil module 21 and the reception part coil module 11 will be referred to as coil modules when it is not specifically distinguish them, and the reception part coil module will be described as an example in the following embodiments.

Figure 3:
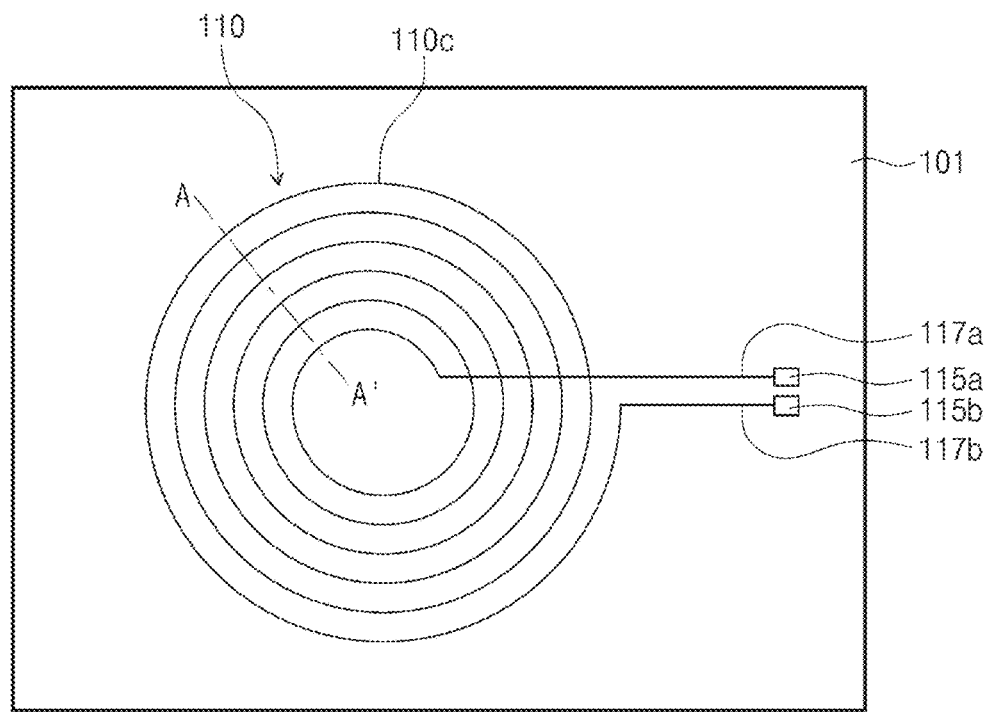
FIG. 3 is a plan view illustrating a coil module according to an embodiment of the inventive concept.

FIG. 3 is a plan view illustrating a coil module according to an embodiment of the inventive concept.

Referring to FIG. 3, the electronic device (for example, a wireless charging device) includes a coil module that receives or transmits electric power or signals by using an electromagnetic field, and the coil module includes a coil part 110 provided on at least one surface of a board 101.

The board 101 has a flat plate shape (or a sheet shape), and is disposed on one side of the coil part 110. The coil part 110 may be provided directly on one surface of the board 101 or may be provided on one surface of the board 101 while another element such as an adhesive being interposed therebetween. Hereinafter, the coil part 110 provided on one surface of the board 101 is described as an example, but the relationship between the coil part 110 and the board 101 is not limited thereto, and coil parts 110 may be provided on opposite surfaces of the board 101.

The board 101 may be formed of a material having a heat-resistant property and a pressure-resistant property. The board 101 may be a magnetic body. That is, the board 101 may have a form of a magnetic sheet. The magnetic sheet is provided to efficiently form a magnetic path of the magnetic field generated by a coil 111. To achieve this, the magnetic sheet also may be formed of a material that may easily form a magnetic path. The magnetic sheet may be a ferrite sheet. However, the magnetic sheet has a magnetism and is not limited only to the ferrite sheet, and may be at least one of a ferrite sheet, a soft ferrite metal sheet, and a hybrid type sheet, to which a metal and a ferrite is complexly applied. Furthermore, the magnetic sheet may be a thin sheet that is manufactured by making a metal thin film thinner and distributing and pressing on an insulating resin. Various ferrite material compositions may be used, and for example, Fe, Fe—Si, Fe—Al—Si, Fe—Ni, and Fe—Co may be used, and various materials other than a ferrite may be used so long as they are magnetic materials.

The board 101 may be formed of other insulating materials. For example, the board 101 may be formed of a polymer material such as an epoxy resin. However, the material of the board 101 is not limited thereto, and the board 101 may be a printed circuit board (PCB) 101, a ceramic board 101, a pre-molded board 101, or a direct bonded copper (DBC) board 101, or may be an insulating metal substrate (IMS) 101. However, the material of the board 101 is not limited thereto, and various insulating materials. When the board 101 is formed of a material other than the magnetic body, a separate magnetic sheet may be additionally provided between the board 101 and the battery. In this case, the additional magnetic sheet is used both to efficiently form a magnetic path of a magnetic field and to interrupt a magnetic path in a direction of the battery.

According to the present embodiment, the board 101 may be rigid, but the inventive concept is not limited thereto, and may be soft, that is, flexible. The rigid or flexible board may be provided in various forms, and for example may be provided as a rigid printed circuit board, a flexible printed circuit board, or a rolled copper printed circuit board that may be used as a lead frame.

The coil part 110 may be provided on at least one surface of the board 101 in a form of a wiring line. That is, the coil part 110 may be provided on a plane defined by one surface of the board 101, on at least one surface of the board 101, and may include a spiral coil 110c having a spiral shape.

The spiral coil 110c may include the coil 111 formed of a conductor, for example, a metal, and a magnetic part 113 that covers at least a portion of the coil 111. The coil part 110 also may include first and second extraction parts 117a and 117b provided at opposite ends of the coil 111 to extend to an outside of the spiral coil 110c, and first and second terminal parts 115a and 115b provided at ends of the first and second extraction parts 117a and 117b to be connected to other configurations (for example, a circuit part). In the present embodiment, it is illustrated that the first and second terminal parts 115a and 115b are provided in the quadrangular board 101, but the inventive concept is not limited thereto, and they may extend for electrical connection to the outside and protrude from one side of the board 101. The first and second terminal parts 115a and 115b may include a plurality of connection terminals.

In the present embodiment, the coil 111 may be a circular, elliptical, or polygonal flat coil that is wound in a clockwise or counterclockwise direction. The shape of the coil 111 is not limited to the drawing, and may be in a form of a winding. The coil may be a coil in a form of a Litz wire having several strands or a polyurethane enameled wire (UEW). In an embodiment of the inventive concept, the material of the coil also is not limited thereto, and may be formed of a material including copper or ceramic. The kinds of the coil may include the Litz wire or the UEW wire as a copper coil, which has been described above, and a laminated ceramic condenser coil (MLCC) or a low-temperature co-fired ceramic coil (LTCC) as a ceramic contained winding coil material.

In the present embodiment, the coil 111 may be disposed in a spiral form, starting from a central portion of the board 101. Then, according to the embodiment, a rotational direction of the coil 111 may be provided to be rotated spirally from an inner side to an outer side. Although it is illustrated that the coil 111 has a circular spiral shape in the drawing, the inventive concept is not limited thereto, and any spiral shape that may be rotated to generate resonances in the same current direction may be applied.

The above-described coil 111 may function as the coil 111 for wireless power transfer (WPT) when transmission of electric power is required, may function as the coil 111 for magnetic secure transmission (MST) when magnetic information has to be transmitted wirelessly, and may be provided as the coil 111 for near field communication (NFC). Although it has been described as an example in the present embodiment that the coil 111 performs multiple functions, the inventive concept is not limited thereto, and the coil 111 may include the coil 111 for WPT that performs a power transmission function.

The coil 111 may be provided only on a front surface of the board 101, or coils 111 may be provided on both the front surface and a rear surface thereof. When the coils 111 is provided on both the front surface and the rear surface, the two coils 111 may be electrically separated from each other, or at least portions thereof may be connected to each other through a via to be electrically connected to each other. In other words, when the coils 111 are formed on opposite surfaces of the board 101, opposite ends of each of the coils 111 may be connected to each other such that the coils 111 constitutes a parallel circuit, or ends at the centers thereof may be connected to each other to constitute a series circuit. To achieve this, a conductive via (not illustrated) for electrically connecting the coils 111 may be formed in interiors of the coils 111.

Here, at least one of the first and second extraction parts 117a and 117b may be disposed while an insulator that is separate from a crossing wiring line to prevent a short circuit with the crossing wiring line being interposed between the at least one of the first and second extraction parts 117a and 117b and the crossing wiring line, or may be connected to the wiring line through a wiring line provided on another surface through a via.

The above-described structure of the coil module has been described as an example, and in the embodiment of the inventive concept, connection relationships thereof and the number or a disposition of the coils 111 may be modified in various forms.

Figure 4:
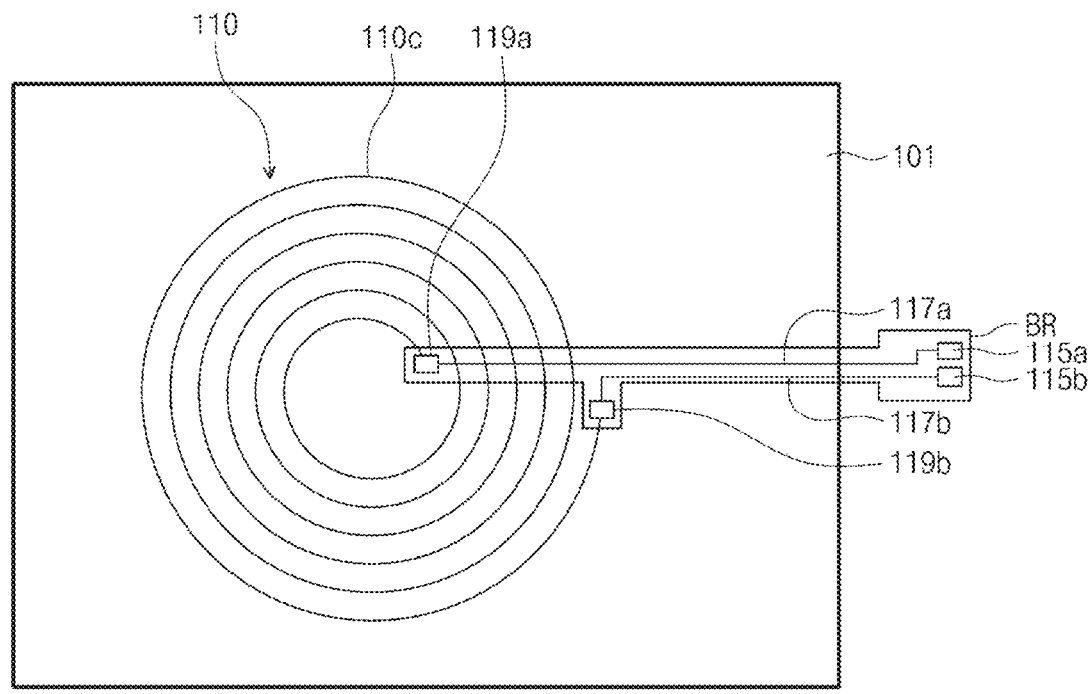
FIG. 4 is a plan view illustrating a coil module according to an embodiment of the inventive concept.

FIG. 4 is a plan view illustrating a coil module according to an embodiment of the inventive concept.

Referring to FIG. 4, according to the coil module according to the embodiment of the inventive concept, the extraction parts and terminal parts connected to the opposite ends of the coil part 110 may be manufactured separately to be connected. That is, the coil 111, and the first and second extraction parts 117a and 117b and the first and second terminal parts 115a and 115b connected to the opposite ends of the coil 111 may not be disposed on the board 101 like the spiral coil 110c, but may made as a bridge BR that is a separate configuration separated from the board 101 to be attached to the board 101. Here, first and second pad parts (not illustrated) are provided at the opposite ends of the coil 111. The bridge BR may include first and second bridge pads 119a and 119b corresponding to the first and second pad parts of the opposite ends of the coil 111, the first and second extraction parts 117a and 117b connected to the first and second bridge pads 119a and 119b, respectively, and the first and second terminal parts 115a and 115b connected to the first and second extraction parts 117a and 117b. The first and second bridge pads 119a and 119b, the first and second extraction parts 117a and 117b, and the first and second terminal parts 115a and 115b may be formed on the bridge board 101, and the bridge board 101 may be a rigid or flexible board 101.

The first and second bridge pads 119a and 119b may be connected to the first and second pad parts of the coil 111 by a conductor. As an example, the first and second bridge pads 119a and 119b and the first and second pad parts of the coil 111 may be connected to each other through soldering using heat, ultrasonic waves, laser beams, or the like, but the inventive concept is not limited thereto, and they may be variously joined to each other, for example, by using an amorphous conductive film.

Here, the configuration of the bridge BR is an example for electrically connecting the opposite ends of the coil 111 to another configuration, and the inventive concept is not limited thereto and may be modified in various forms.

Figure 5:
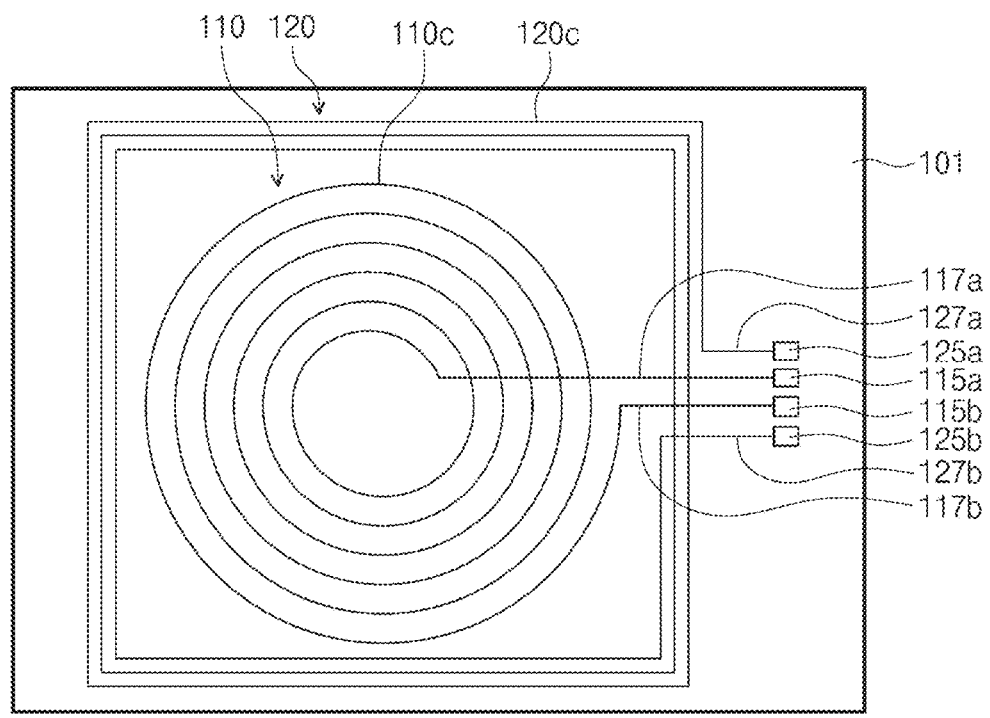
FIG. 5 illustrates two coil parts in a coil module according to an embodiment of the inventive concept.

FIG. 5 illustrates two coil parts in a coil module according to an embodiment of the inventive concept.

In the present embodiments, to distinguish different coil parts, the coil part described in the above-described embodiment is described as the first coil part 110 and an added coil part is described as a second coil part 120, and an aspect that is different from that of the above-described embodiment will be mainly described for convenience of description.

In the embodiment of the inventive concept, the coil module may include the first coil part 110 provided on at least one surface or the board 101 and having a spiral shape, and the second coil part 120 provided on at least one surface of the board and disposed on an outside of the first coil part 110.

The first coil part 110 includes the first and second extraction parts 117a and 117b and the first and second terminal parts 115a and 115b connected to the first spiral coil 110c, and the second coil part 120 includes first and second extraction parts 127a and 127b and first and second terminal parts 125a and 125b connected to a second spiral coil 120c.

Subsequently, the second spiral coil 120c is provided on at least one surface of the board 101, and is disposed on an outside of the first spiral coil 110c to have a shape that surrounds the first spiral coil 110c as a whole. Although it is illustrated in the present embodiment that the second spiral coil 120c has separate extraction parts and terminal parts, the inventive concept is not limited thereto, and one end of the second spiral coil 120c may be connected to the first coil and an opposite end thereof may be connected to the terminal part.

The second spiral coil 120c is disposed at an outskirt of the first spiral coil 110c as a whole, but the inventive concept is not limited thereto, and at least a portion thereof may be provided to cross the first spiral coil 110c.

In the embodiment of the inventive concept, the second spiral coil 120c may function as a coil for MST when it is necessary to wirelessly transmit magnetic information, and may be used as a coil for NFC for near field wireless communication.

In the embodiment of the inventive concept, when a frequency band of the second spiral coil 120c is higher than a frequency band of the first spiral coil 110c, the second spiral coil 120c may have a conductive pattern of a line width that is smaller than that of the first spiral coil 110c, and an interval of wiring thereof may be smaller than that of the first spiral coil 110c.

In the embodiment of the inventive concept, the coil module may have various shapes.

Figure 6:
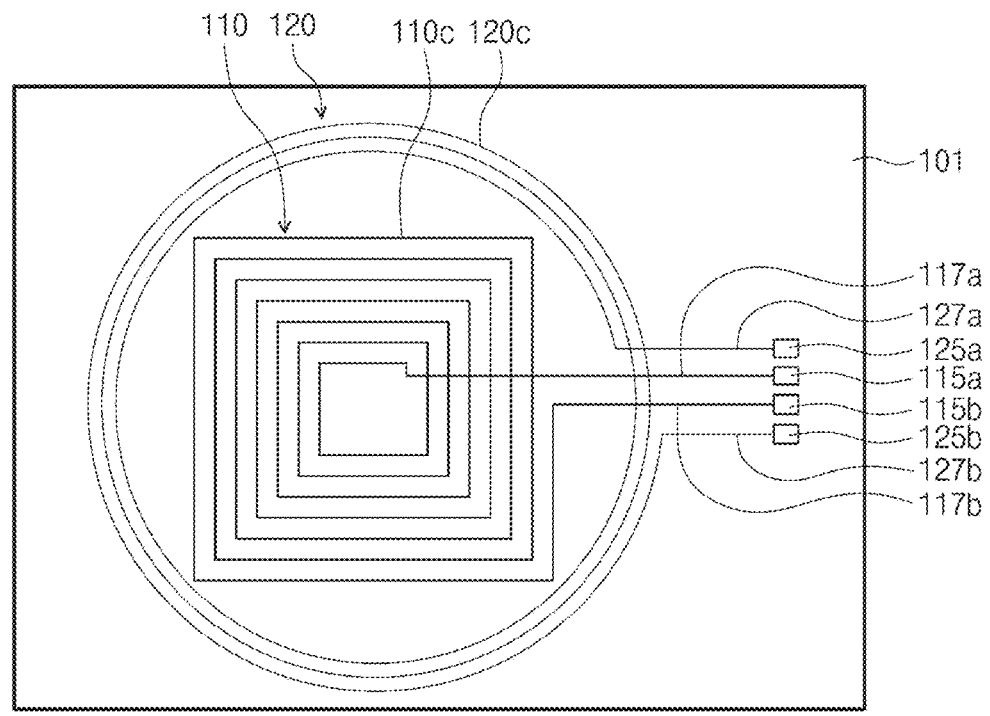
FIG. 6 illustrates a shape of a coil according to an embodiment of the inventive concept.

FIG. 6 illustrates a shape of the coil according to the embodiment of the inventive concept, and unlike FIG. 5, discloses that the first spiral coil 110c and the second spiral coil 120c have shapes, in which spiral arrangements thereof on a plane are different.

Referring to FIG. 6, the first spiral coil 110c has one quadrangular shape when viewed on a plane, and the second spiral coil 120c has a circular shape of a spiral shape at an outskirt of the first spiral coil 110c. The above-described embodiment of FIG. 5 is different from the present embodiment in that the first spiral coil 110c has a circular shape and the second spiral coil 120c has a quadrangular shape. In this way, the first spiral coil 110c and the second spiral coil 120c may have different shapes, and may be variously modified without departing from the inventive concept even though not illustrated here.

In FIGS. 5 and 6, the first spiral coil 110c and the second spiral coil 120c may be independently used as any one of a coil for WPT, a coil for NFC, and a coil for MST. A combination of the first spiral coil 110c and the second spiral coil 120c, for example, may be used for a coil for WPT and a coil for NFC, a coil for MST and a coil for WPT, or a coil for MST and a coil for NFC. However, the purpose of the coil is not limited thereto, and it is apparent that the coil may be used for another purpose and a coil that is not disclosed may be further added.

According to the embodiment of the inventive concept, in the above-described various coil modules, the coil part includes a magnetic part that acts as an electromagnetic booster that improves an intensity of an electromagnetic field generated on a surface of the coil. This will be described in detail as follows.

Figure 7:
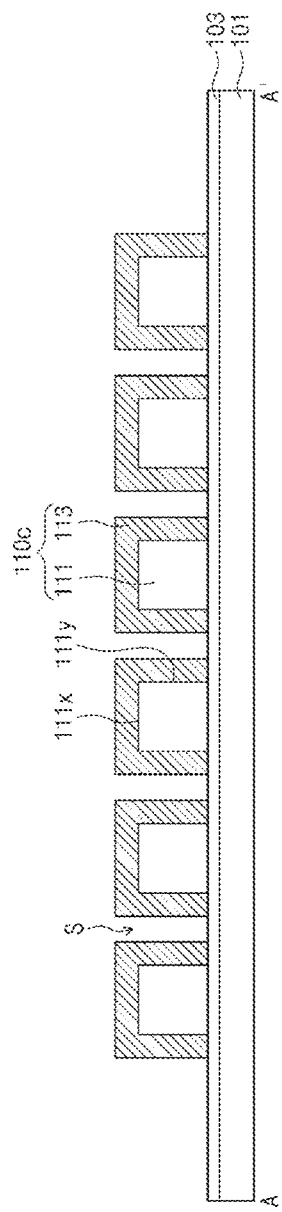
FIG. 7 is a cross-sectional view taken along a line A-A' of FIG. 3.

FIG. 7 is a cross-sectional view taken along a line A-A' of FIG. 3, and is a cross-sectional view illustrating a shape of the coil part.

Referring to FIGS. 3 and 7, the coil module includes the board 101, and the coil part 110 provided on at least one surface of the board 101, and an insulation part 103 may be provided between the board 101 and the coil part 110.

The insulation part 103 is provided in a form of a membrane or a film between the board 101 and the coil part 110, and any material that may insulate the board 101 and the coil part 110 may be used for the insulation part 103 without limitation, and the insulation part 103 may be formed of various materials. For example, the insulation part 103 may include an organic insulation film, an inorganic insulation film, or an insulation film formed of an organic-inorganic ionic thermocouple composite material.

The magnetic part 113 may directly contact the coil 111 and may cover at least a portion of an exposed surface of the coil 111. The magnetic part 113 may be formed on a surface of the coil 111 through a process such as plating, deposition, or coating.

The magnetic part 113 is provided to increase a wireless charging efficiency in the transmission/reception coil 111 of the wireless charger and lower a heat emission temperature in the charger. To achieve this, the magnetic part 113 needs to directly contact the coil 111, and at least a portion of the magnetic part 113 directly contacts the coil 111. When another configuration is interposed between the magnetic part 113 and the coil 111, an effect and a heat dissipation effect of the following magnetic body may be decreased.

The magnetic body has a high permeability, and the magnetic body is provided on the coil 111 to function to strongly boost an intensity of an electromagnetic field generated on a surface of the coil 111. It appears that the phenomenon occurs because permeability is enhanced, permeation loss is lowered, and a frequency bandwidth for use of wireless charging is enhanced by adding a high magnetic material on the coil 111, and accordingly, it is determined that wireless charging efficiency is increased and a surface density of the electromagnetic field generated in the wireless charging coil 111 is further concentrated on the surface of the metal coil 111.

The magnetic part 113 may be formed of a magnetic material. For example, the magnetic body constituting the magnetic part 113 may be a metal pallet, a nano crystal, an amorphous material, a metal-based or ferrite pellet, a ferrite complex, a sendust pallet, and a sendust complex. The material of the magnetic body is not specifically limited.

In the embodiment of the inventive concept, the magnetic part 113 may include an alloy magnetic body or a ferrite magnetic body including a combination of two or three or more elements selected from a group consisting of Fe, Ni, Co, Mn, Al, Zn, Cu, Ba, Ti, Sn, Sr, P, B, N, C, W, Cr, Bi, Li, Y, and Cd. In the magnetic part 113, a permeability of the magnetic body manufactured through a process of heat-treating or mixing the materials may be controlled. In particular, a permeability Ur of the product may be changed through a process of heat-treating or mixing the materials including Fe, Ni, Mn, Si, B, and C. In the embodiment of the inventive concept, particularly, main substances of the magnetic part 113 may be Ni and Fe, and the permeability Ur and a magnetic flux density Bs may be controlled by adjusting a content of Fe. Furthermore, the magnetic part is a soft magnetic material, and a coercive force thereof may be controlled by adjusting contents of Ni and Fe. In the embodiment of the inventive concept, in addition to the materials of the magnetic part 113, Si and/or B may be added as impurities.

A permeability and a permeation loss of the wireless transmitting/receiving device may vary according to a thickness of the magnetic part 113, and the thickness of the magnetic part 113 may be about 0.01 µm to about 80 µm in the embodiment, may be about 0.1 µm to about 40 µm in another embodiment, and may be about 1 µm to about 5 µm in another embodiment. In the present embodiment, when the magnetic part 113 on an upper surface 111x of the coil 111 is thick, an intensity of the magnetic field in an upward direction may be lowered, and in this case, it may be difficult to transmit signals or electric power. Accordingly, a thickness of the upper surface 111x of the coil 111 may have the above-described values. However, in this case, the values may be changed according to a state or a structure, or other factors of the coil 111. In the present embodiment, a permeability of the magnetic part 113 may be about 50µ' to about 3000µ' in one embodiment, and may be about 100µ' to about 2000µ' in another embodiment.

The coil 111 may have various shapes when viewed on a cross-section thereof. In the embodiment of the inventive concept, the coil 111 has a circular shape, but may have various polygonal shapes that contact the board 101 or the insulation part 103 on the board 101. For example, a cross-section of the coil 111 may have a quadrangular shape (a rectangular shape or a trapezoidal shape). However, the shape of the coil 111 is not limited thereto.

In the embodiment of the inventive concept, the magnetic part 113 may cover at least some of the upper surface 111x, a side surface 111y, and a lower surface of the coil 111, and for example, may cover both of the upper surface 111x and the side surface 111y of the coil 111, cover at least one of the upper surface 111x and the side surface 111y, and cover only at least a portion of the upper surface 111x and the side surface 111y if necessary. Furthermore, the lower surface of the coil 111 may be covered if necessary.

In the present embodiment, the magnetic part 113 may cover both of the upper surface 111x and the side surface 111y of the coil 111. Here, a spacing part "S" may be provided in a space between the coils 111, which is covered by the magnetic part 113. In this case, the spacing part may be provided with an insulator such that the adjacent two coils 110c are sufficiently insulated. The insulator may be provided to prevent a short-circuit of the adjacent two magnetic parts 113. For example, the spacing part may be provided with air.

In the embodiment of the inventive concept, the spacing part may be provided with another additional insulation part, in addition to the air.

When the insulation part 103 between the coil 111 and the board 101 is the first insulation part 103 and the insulation part provided on the spiral coil 110c is the second insulation part for convenience' sake, the first and second insulation parts may be formed of various insulating materials, for example, a polymer resin. The second insulation part may be provided between the adjacent spiral coils 110c and on an upper side of the spiral coils 110c to cover both of the spiral coils 110c. The materials that constitute the first and second insulation parts are not limited thereto, and may be the same or different.

According to the embodiment of the inventive concept, the coil 111 of the coil module according to the embodiment of the inventive concept is divided into a plurality of parts and a surface thereof is divided into a plurality of areas, and a skin effect is maximized by providing a wiring line covered with a magnetic body on the surface thereof. Furthermore, a proximity effect of the adjacent wiring lines is alleviated through the structure having the plurality of divided parts. That is, the magnetic part alleviates, among a skin effect and a proximity effect of an eddy current generated in the coil, the proximity effect, and this is achieved through a method of isolating electric power between the coils that are rotated in one direction by using a magnetic body. In this way, when the skin effect is increased and the proximity effect is decreased, the eddy current effect is minimized whereby the wireless charging efficiency is increased and emission of heat is reduced as well.

Through this, the coil module according to the embodiment of the inventive concept may have a high wireless charging efficiency while showing an excellent heat dissipation effect when low, middle, and high electric power is wirelessly transmitted and received for a long time.

That is, when being used as a wireless charging transmission/reception coil, the coil module according to the embodiment of the inventive concept having the above structure functions to strongly boost an intensity of an electromagnetic field by adding a magnetic body having a high permeability on a surface of the wireless charging transmission/reception coil. Because a high magnetic material is added to an interior of the wireless charger, permeability is enhanced, permeation loss is lowered, and a bandwidth of a frequency for use of wireless charging is enhanced, and as a result, a wireless charging efficiency is increased. Here, a surface density of the electromagnetic field generated by the wireless charging transmission/reception coil is further concentrated on the surface of the coil.

In the existing invention, a magnetic sheet is provided at a lower portion of the coil 111 and a structure, in which heat dissipation sheets, for example, graphite as a material for dissipation of heat, are stacked separately from the magnetic sheet. In the stack structure, the magnetic sheets function as gates for passing an electromagnetic field radiated from the metal coil 111 through a magnetic layer, and this functions to activate a horizontal electromagnetic field. However, in the inventive concept, because the coil 111 covers the horizontal electromagnetic field due to the magnetic body at a central portion thereof and the magnetic material as well, the covered magnetic body is operated as an electromagnetic booster that further activates the electromagnetic field formed by the coil 111.

In the embodiment of the inventive concept, a shape of the first spiral coil 110c of the coil part 110, in particular, shapes of the coil 111 and the magnetic body may be changed in various forms.

Figure 8A:
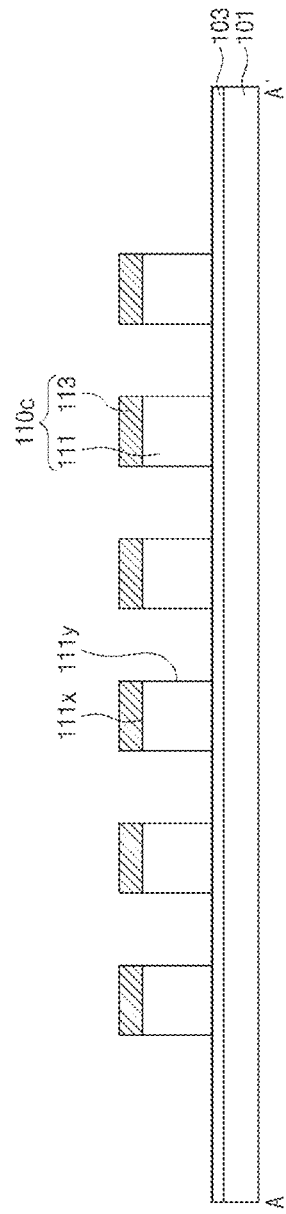
FIGS. 8A to 8E, 9A, and 9B are cross-sectional views illustrating a shape of a first spiral coil according to embodiments of the inventive concept.
Figure 8B:
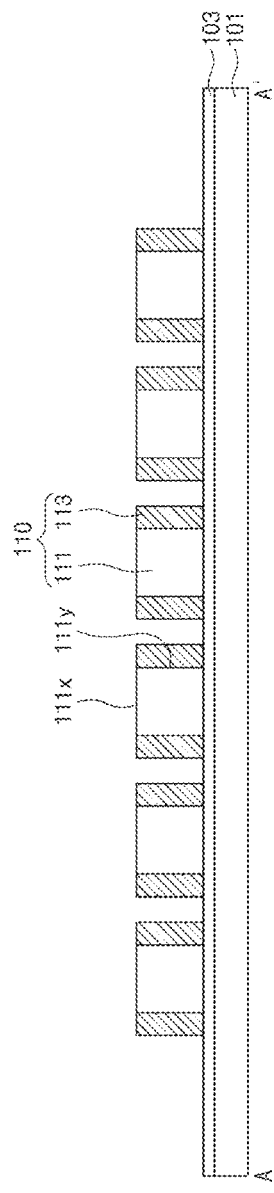
Figure 8C:
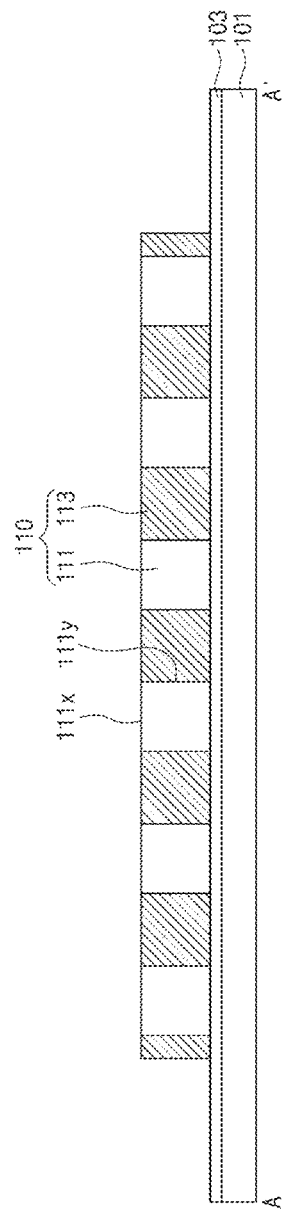
Figure 8D:
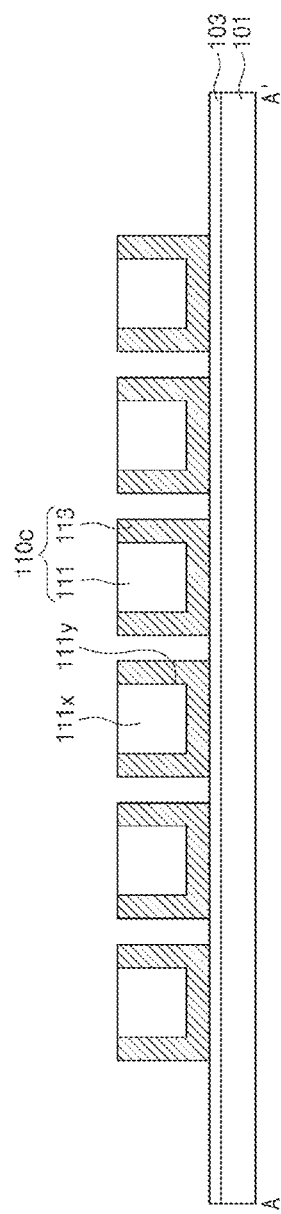

FIGS. 8A to 8E, 9A, and 9B are cross-sectional views illustrating the shape of the first spiral coil 110c according to embodiments of the inventive concept;

Referring to FIGS. 8A to 8E, the magnetic part 113 may be provided only on the upper surface 111x of the coil 111 as illustrated in FIG. 8A, may be provided only on the side surface 111y of the coil 111 as illustrated in FIGS. 8B and 8C, and may be provided on the side surface lily and the lower surface of the coil 111 as illustrated in FIG. 8D. Here, FIGS. 8B and 8C illustrate that the magnetic body is provided between the adjacent two coils 111 and a spacing part, by which the magnetic body is spaced, is provided and is not provided.

Figure 8E:
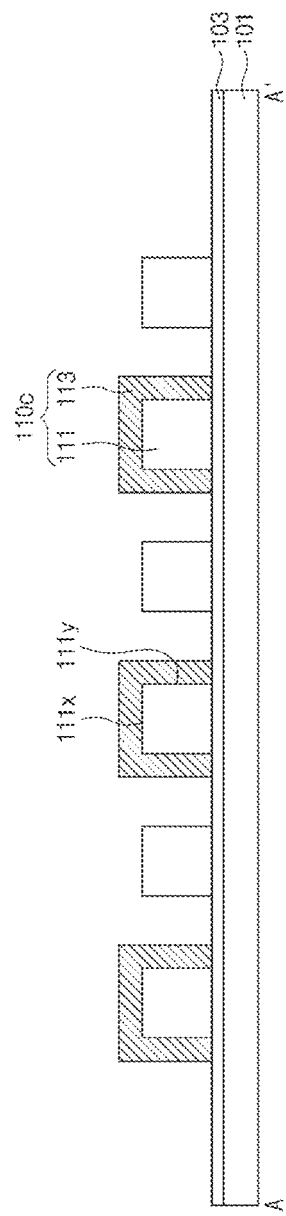

Furthermore, as illustrated in FIG. 8E, the magnetic body may be provided only on the upper surface 111x and the side surface 111y of some coils 111 and may not be provided in the remaining coils. When the magnetic part 113 is provided only in some coils 111, the coil 111 provided with the magnetic part 113 and the coil 111 not provided with the magnetic part 113 may be disposed alternately.

Figure 9A:
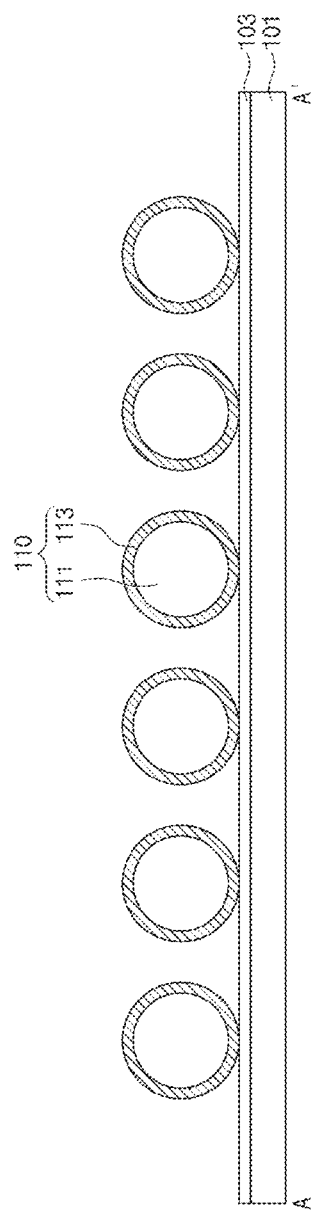
Figure 9B:
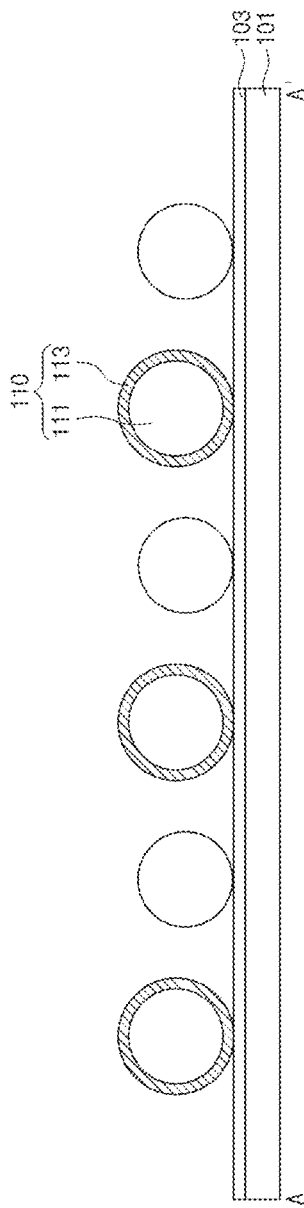

Furthermore, a cross-section of the coil 111 may have a circular shape, that is, a shape of a wire as in FIGS. 9A and 9B, the magnetic part 113 may be provided along an outer surface of the coil 111 as a whole even when the cross-section of the coil has a circular shape, or the magnetic part 113 may be provided in some coils but may not be provided in the remaining coils. Furthermore, the coil 111 and the magnetic part 113 may be surrounded by the first insulation part or by the second insulation part without any board.

In this way, when the magnetic part 113 is provided on the coil 111, the coil 111 and/or the magnetic part 113 may be provided regularly or irregularly, and distances between the adjacent coils 111 and/or the magnetic part 113 may be the same or different. The magnetic part 113 and the coils 111 may be disposed in various forms, and the disposition of the magnetic part 113 and the coils 111 may be modified according to a thickness of the coils 111, a disposition interval of the coils 111, a disposition form of the coils 111, a material of the magnetic part 113, and a permeability according to the material of the magnetic part 113.

Figure 10:
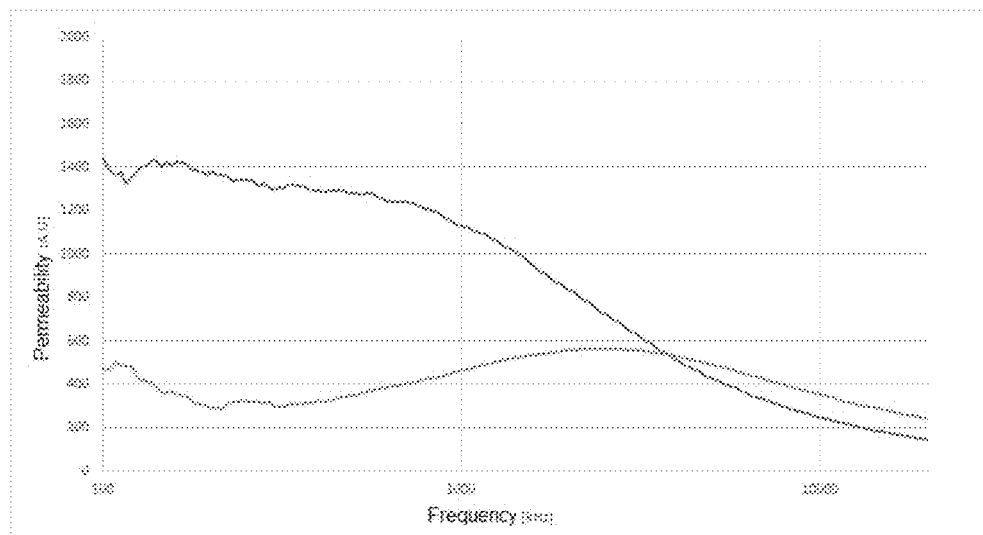
FIG. 10 is a graph depicting magnetic permeability and magnetic permeation losses of an existing invention, which is not provided with a magnetic part, and a coil part according to the inventive concept, which is provided with a magnetic part.

FIG. 10 is a graph depicting magnetic permeability and magnetic permeation losses of an existing invention, which is not provided with a magnetic part, and a coil part according to the inventive concept, which is provided with a magnetic part. In the present graph, a blue graph depicts a permeability, and an orange graph depicts a permeation loss.

According to FIG. 10, a very high permeability is shown at 100 kHz to 10000 kHz in the case of the coil part according to the embodiment of the inventive concept. Through this, it may be seen that magnetic susceptibility is increased by providing the magnetic part on the coil whereby the magnetic part acts as an electromagnetic booster.

The coil module according to the embodiment of the inventive concept significantly shows excellent electrical characteristics and heat dissipation characteristics as compared with the existing invention.

Figure 11:
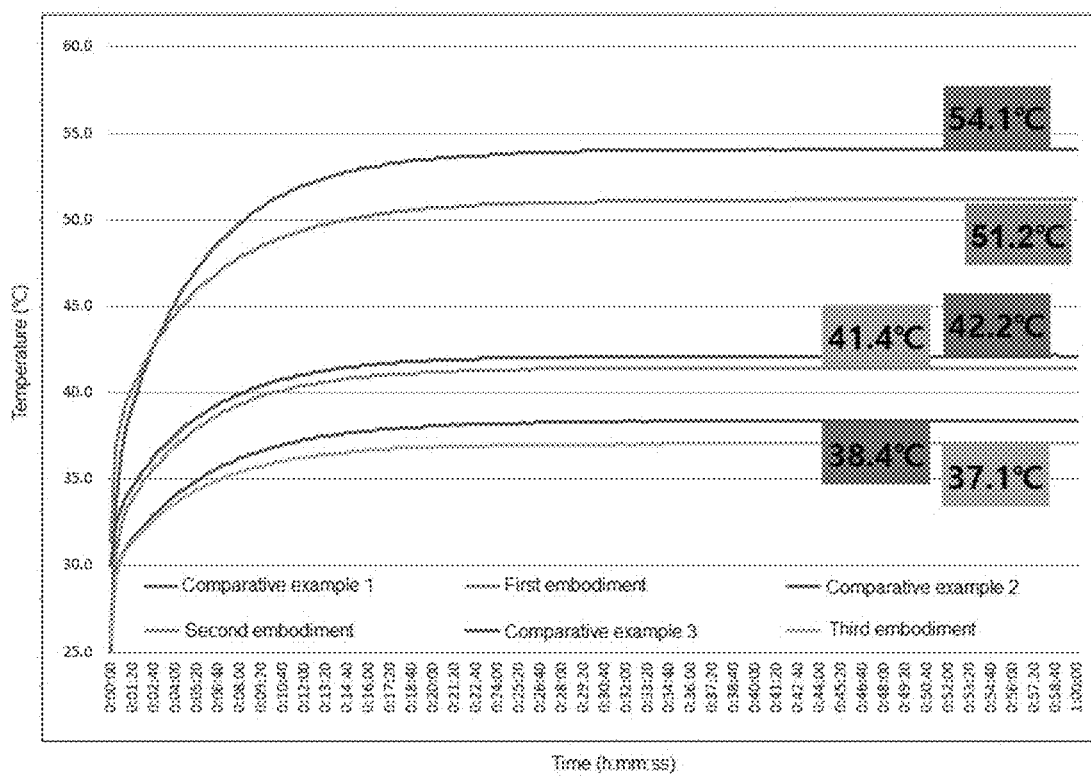
FIG. 11 illustrates changes in temperature according to time, in a coil module of an existing invention and a coil module according to an embodiment of the inventive concept.

Table 1 shows electrical characteristics according to the coil module according to the embodiment of the existing invention and the coil module of the inventive concept, and FIG. 11 illustrates changes in temperature over time in the coil module of the existing invention and in the coil module according to the embodiment of the inventive concept.

In Table 1 and FIG. 11, the coils are formed in the same flexible board in comparative example 1 and the first embodiment, in which the coil module in comparative example 1 is manufactured without any magnetic part as in the existing invention and the coil module in the first embodiment is manufactured to include the magnetic part according to the embodiment of the inventive concept, the coils are formed in a copper rolled board in comparative example 2 and the second embodiment, in which the coil module in comparative example 2 is manufactured without any magnetic part and the coil module in the second embodiment is a lead frame module manufactured to include the magnetic part according to the embodiment of the inventive concept, and a cross-section of the coil module in comparative example 3 and the third embodiment is a wire coil having a circular shape, in which the coil module is manufactured without any magnetic part as in the existing invention in comparative example 3 and the coil module in the third embodiment is manufactured to include the magnetic part according to the embodiment of the inventive concept All the comparative examples and the embodiments were experimented in the same condition, except for presence of the magnetic part.

TABLE 1

| 100 kHz | Ls (uH) | Rs (mΩ) | Rdc (mΩ) | Rs/Rdc | Q (calculated value) | Q (measured value) |
|---|---|---|---|---|---|---|
| First Embodiment | 9.38 | 284 | 173 | 1.64 | 20.74 | 43.00 |
| Comparative example 1 | 9.00 | 275 | 170 | 1.62 | 20.55 | 40.00 |
| Second Embodiment | 8.60 | 285 | 162 | 1.76 | 19.95 | 33.50 |
| Comparative example 2 | 8.38 | 309 | 162 | 1.91 | 17.03 | 29.00 |
| Third Embodiment | 8.40 | 350 | 200 | 1.75 | 15.07 | 28.00 |
| Comparative example 3 | 8.50 | 398 | 236 | 1.69 | 13.41 | 27.30 |

As illustrated in Table 1, the first to third embodiments showed significantly excellent results at the same resistances and Q values in the same condition, except for presence of the magnetic part, as compared with comparative examples 1 to 3. As illustrated in FIG. 11, it may be identified that temperatures of the coil modules were lowered in the embodiments, in which the coil modules were manufactured to include the magnetic part in the same condition, as compared with the comparative examples. Accordingly, in an embodiment of the inventive concept, it is clear that the inventive concept shows a significantly high heat dissipation effect as compared with the existing invention.

Furthermore, the coil module according to the embodiment of the inventive concept shows a current density and an intensity of a magnetic field, which are significantly uniform as compared with those of the existing invention.

FIGS. 12A to 12C and 13A to 13C illustrate simulation results representing current density distributions in a coil of an existing invention and a coil according to an embodiment of the inventive concept.

In FIGS. 12A to 12C and 13A to 13C, all other conditions, except for the shape of the coil part, were maintained in the same way, and experiments were made with an assumption that three adjacent coil wiring lines are present.

Figure 12A:
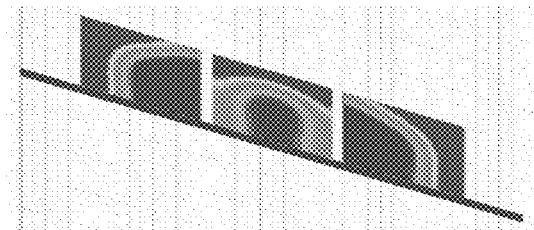
FIGS. 12A to 12C and 13A to 13C illustrate simulation results representing current density distributions in a coil of an existing invention and a coil according to an embodiment of the inventive concept.
Figure 12B:
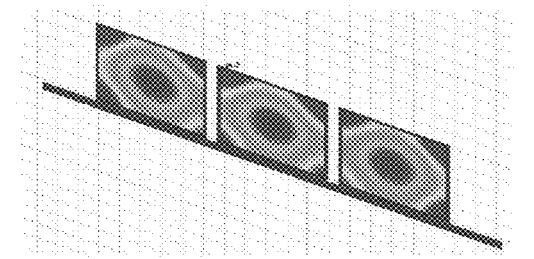
Figure 12C:
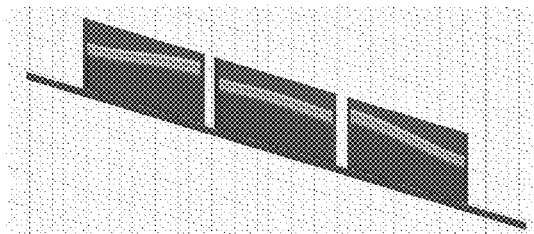
Figure 13A:
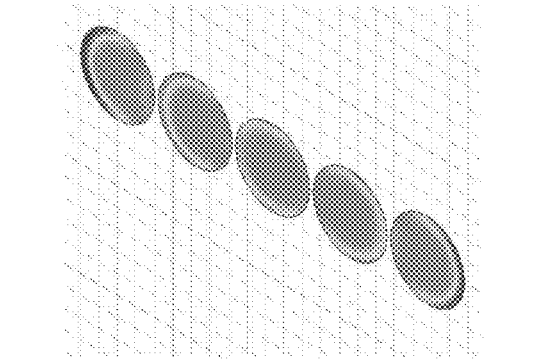
Figure 13B:
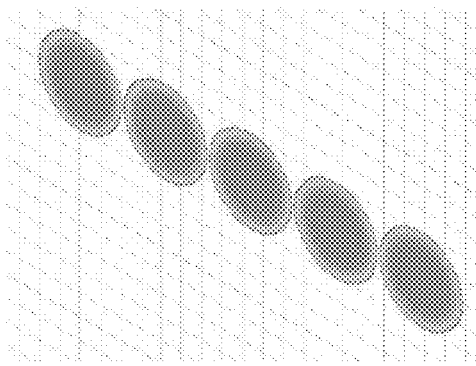
Figure 13C:
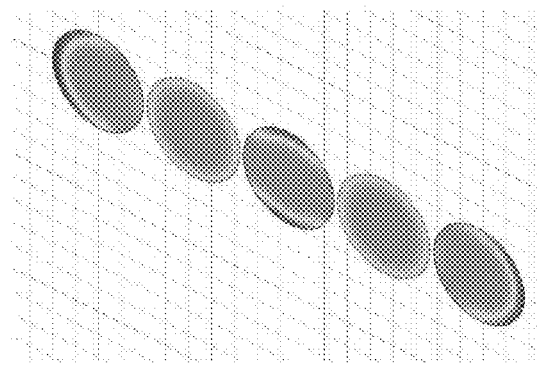

Here, FIG. 12A illustrates a simulation result of a structure, in which only a coil is provided without any magnetic part, FIG. 12B illustrates a simulation result of a structure, in which a magnetic part covers an upper surface and a side surface of a coil as in the structure of FIG. 3B, and FIG. 12C illustrates a simulation result of a structure, in which a magnetic part covers a side surface and a lower surface of a coil as in FIG. 4D. FIG. 13A illustrates a simulation result of a structure, in which a circular wire is provided without any magnetic part, FIG. 13B illustrates a simulation result of a structure, in which a magnetic part covers an entire wire as in the structure of FIG. 5A, and FIG. 13C illustrates a simulation result of a structure, in which magnetic parts are provided to a wire alternately as in FIG. 5B. In the drawings, a current density increases and a magnetic field also increases as the color goes toward a red color, and a current density decreases and a magnetic field also decreases as the color goes toward a blue color.

Referring to FIGS. 12A to 12C and 13A to 13C, a current density and deviation of magnetic fields according to a location of a coil is severe and uneven in FIGS. 12A and 13A, in which no magnetic part is provided. In particular, current densities in an outermost coil wire and an interior coil wire have different aspects. However, it may be identified that a current density and deviation of magnetic fields are relatively small and uniform in all of FIGS. 12B, 12C, 13B, and 13C, in which the magnetic part is provided, as compared with the comparative examples, in which no magnetic part is provided. In particular, current densities in an outermost coil wire and an interior coil wire have a relatively uniform aspect regardless of locations thereof.

In this way, because at least a portion of the cover is covered by the magnetic part, current density becomes relatively uniform regardless of the location of the coil, and as a result, an effect that is equivalent to an aspect, in which a distance of the adjacent coils is sufficiently large, appears. That is, because the proximity effect decreases, an eddy current decreases. When a magnetic part is not present, the proximity effect cannot be obtained, and thus the adjacent coil wires have to be spaced apart from each other with a sufficient distance therebetween, and unless, the current density and the unevenness of the magnetic field increase according to a proximity degree of the adjacent coils, and as a result, a frequency of eddy current increases.

Figure 14B:
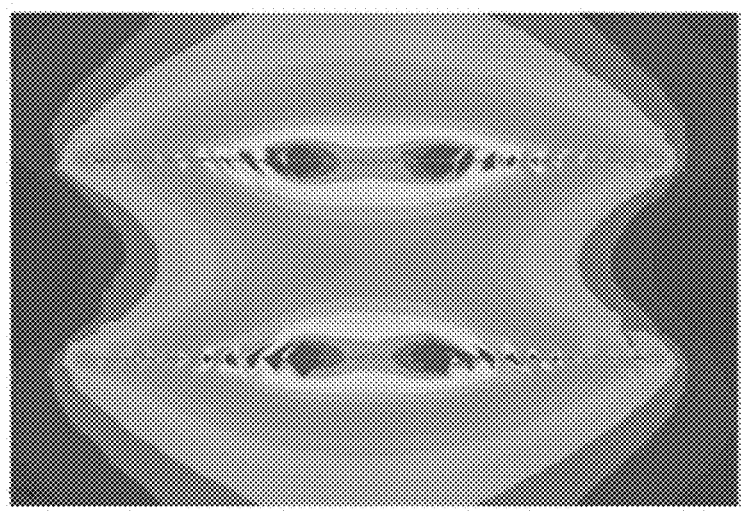
Figure 15A:
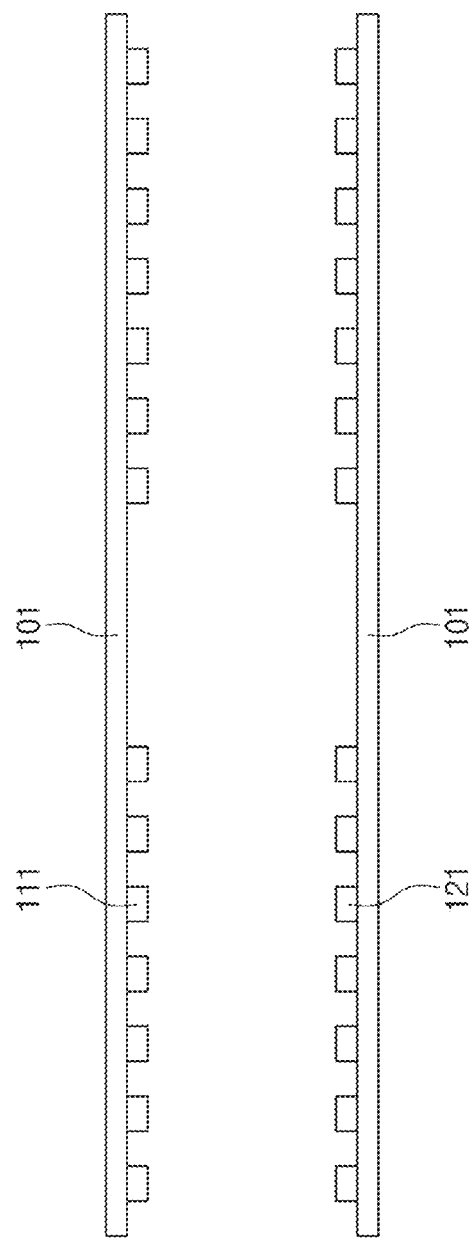
Figure 15B:
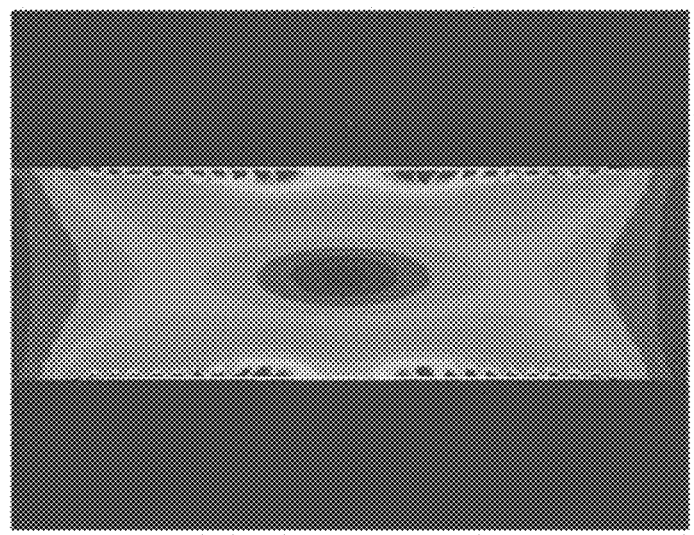
Figure 16B:
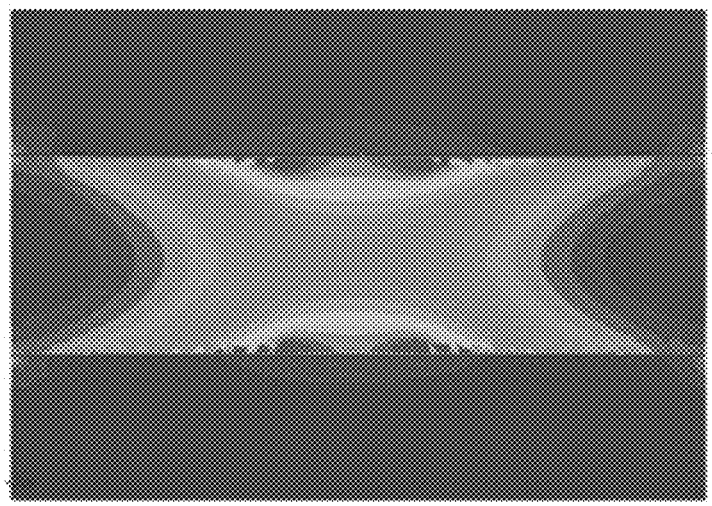
Figure 17A:
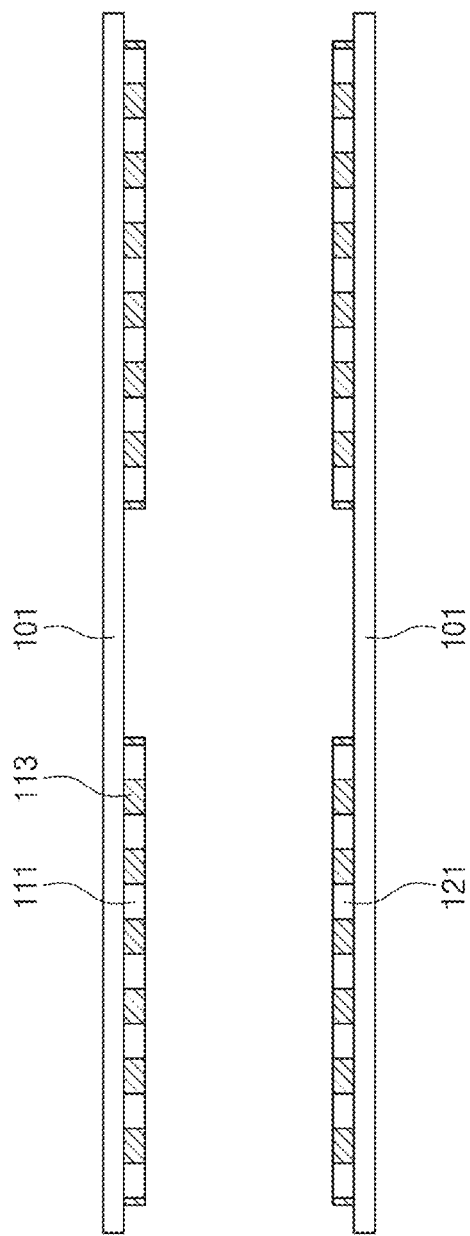
Figure 17B:
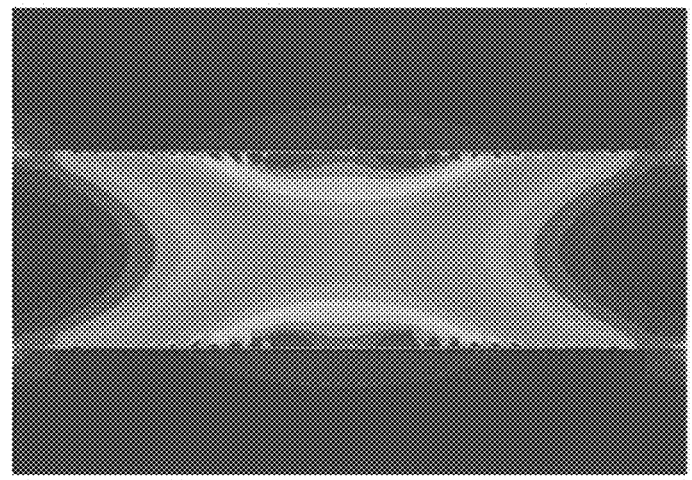

FIGS. 14A, 14B, 15A, 15B, 16A, 16B, 17A, and 17B illustrate simulation results obtained by measuring current densities (that is, intensities of magnetic fields) between a transmission part coil module and a reception part coil module according to an existing invention and between a transmission part coil module and a reception part coil module according to an embodiment of the inventive concept. The reception part coil module was provided on an upper side, and the transmission part coil module was provided on a lower side. FIGS. 14A, 15A, 16A, and 17A illustrate schematic structures of the transmission part coil module and the reception part coil module that were used in experiments, and FIGS. 14B, 15B, 16B, and 17B are views of simulation results thereof. FIGS. 14A and 14B illustrate coil modules according to the existing invention, in which no magnetic part is provided, as comparative examples, and FIGS. 15A, 15B, 16A, 16B, 17A, and 17B illustrate coil modules according to the embodiments of the inventive concept, in which the magnetic part is provided.

Referring to FIGS. 14A and 14B, in the coil module according to the existing invention, in which no magnetic part is provided, an intensity of the magnetic field at a central portion of the coil is strongest, and the intensity of the magnetic field remarkably decreases as it goes toward a periphery of the coil. That is, an unevenness of the magnetic field according to the location of the coil is very severe.

In contrast, FIGS. 15A, 15B, 16A, 16B, 17A, and 17B illustrate that in the coil modules according to the embodiments of the inventive concept, in which the magnetic part is provided, a phenomenon, in which the magnetic fields are concentrated at a central portion of the coil, is significantly alleviated, and the uniformity of the magnetic field in the entire area, in which the coil is provided, is significantly improved as compared with the comparative examples. Furthermore, because an intensity of the magnetic field between the transmission part coil module and the reception part coil module is sufficiently maintained, signals also may be easily transferred. Accordingly, when the coil is used for wireless charging or the like, a wireless charging efficiency remarkably increases.

As described above, the coil module according to the embodiment of the inventive concept may enhance transmission of signals, increase a wireless charging efficiency, and decrease a heat emission temperature in the coil module.

According to the embodiment of the inventive concept, the inventive concept provides a wireless charging coil module that has a high wireless charging efficiency while showing an excellent heat dissipation effect when low, middle, or high electric power is wirelessly transmitted and received for a long time.

Although the preferred embodiment of the inventive concept has been described until now, it can be understood by an ordinary person in the art that the inventive concept may be variously corrected and changed without departing from the spirit and area of the inventive concept described in the claims.

Accordingly, the technical scope of the inventive concept is not limited to the contents descried in the detailed description, but should be determined by the claims.

What is claimed is:

1. A coil module that receives or transmits electric power or signals wirelessly by using an electromagnetic field, the coil module comprising:
    a magnetic sheet;
    a coil provided on one surface of the magnetic sheet to be rotated in one direction; and
    a magnetic part covering at least a portion of the coil while directly contacting a surface of the coil, and configured to act as an electromagnetic booster that enhances an intensity of the electromagnetic field generated on the surface of the coil,
    wherein an outer surface of the coil includes a lower surface facing the magnetic sheet, an upper surface opposed to the lower surface, and a side surface connecting the upper surface and the lower surface,
    wherein the magnetic part covers at least the side surface except for the upper surface, and
    wherein the magnetic part decrease, among a skin effect and a proximity effect of an eddy current generated in the coil, the proximity effect by isolating electric power in a gap of the coil that is rotated in the one direction.

2. The coil module of claim 1, wherein the magnetic part includes at least one element of a metal pallet, a nano crystal, an amorphous material, a metal-based or ferrite pellet, a ferrite complex, a sendust pallet, and a sendust complex.

3. The coil module of claim 2, wherein the magnetic part includes a combination of two or three or more elements selected from a group consisting of Fe, Ni, Co, Mn, Al, Zn, Cu, Ba, Ti, Sn, Si, Sr, P, B, N, C, W, Cr, Bi, Li, Y, and Cd.

4. The coil module of claim 3, wherein the magnetic part includes Fe, Ni, Mn, and C.

5. The coil module of claim 1, wherein the coil is provided as a winding, and the coil includes at least one of a copper coil, a multiline coil, a laminated ceramic condenser coil, a low-temperature co-fired ceramic coil, and a ceramic winding coil.

6. The coil module of claim 1, wherein the magnetic part covers the side surface and the lower surface of the coil.

7. The coil module of claim 6, wherein a thickness of the magnetic part is 0.01 µm to 80 µm.

8. The coil module of claim 6, wherein the magnetic part provided between adjacent portions of the coil has a spacing part between the adjacent portions of the coil.

9. The coil module of claim 8, wherein the spacing part is filled with air or an insulating material.

10. The coil module of claim 1, wherein a cross-section that is perpendicular to a lengthwise direction of the coil has a wire shape, and the magnetic part covers an entire outer peripheral surface of the coil.

11. The coil module of claim 1, wherein a cross-section that is perpendicular to a lengthwise direction of the coil has a quadrangle shape.

12. The coil module of claim 1, wherein when viewed in a cross-section, the coil that is rotated in the one direction includes a plurality of coil cross-sections arranged in a first direction, the magnetic part includes a plurality of magnetic part cross-sections, the plurality of coil cross-sections include a first group of coil cross-sections provided with corresponding ones of the plurality of magnetic part cross-sections, respectively, and a second group of coil cross-sections not provided with the plurality of magnetic part cross-sections, the coil cross-sections of the first group and the coil cross-sections of the second group are provided alternately.

13. The coil module of claim 1, further comprising:
    an insulation part provided between the magnetic sheet and the coil, and
    an additional insulation part provided on the coil and covering the coil and the magnetic part.

14. The coil module of claim 1, wherein the coil includes:
    a first terminal part spirally arranged on the magnetic sheet, and connected to one of opposite ends of the coil; and
    a second terminal part connected to the other of the opposite ends of the coil.

15. The coil module of claim 14, further comprising:
    a bridge provided separately from the magnetic sheet.

16. The coil module of claim 1, wherein the coil includes a plurality of coils provided in different areas, and
    wherein at least one of the coils provided in the different areas includes a corresponding magnetic part covering at least a portion thereof while directly contacting the coil.

17. The coil module of claim 16, wherein the coils include:
    a first coil provided on the magnetic sheet; and
    a second coil provided on an outside of the first coil to surround the first coil.

18. The coil module of claim 17, wherein the first coil is any one of a coil for wireless power transfer (WPT), a coil for near field communication (NFC), and a coil for magnetic secure transmission (MST) and the second coil is any one of a coil for wireless power transfer (WPT), a coil for near field communication (NFC), and a coil for magnetic secure transmission (MST).

* * * * *